Oct. 23, 1928.
E. H. McCLOUD
1,689,149
AUTOMOBILE SPARE WHEEL CARRIER AND BUMPER
Filed Feb. 6, 1928   2 Sheets-Sheet 1
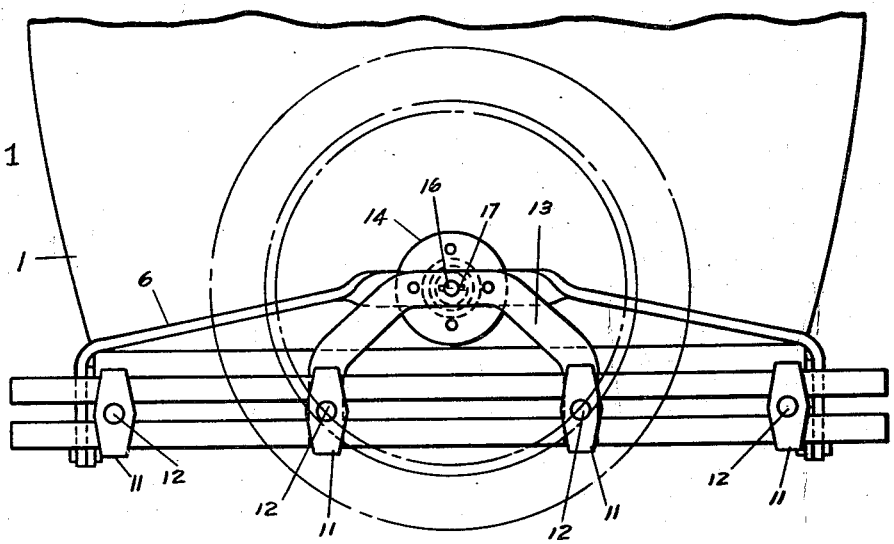
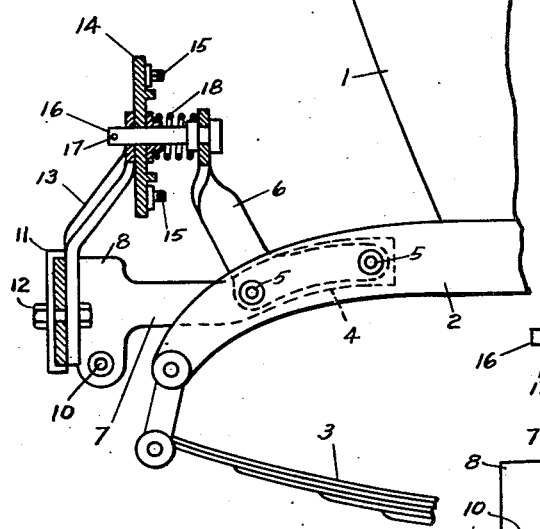
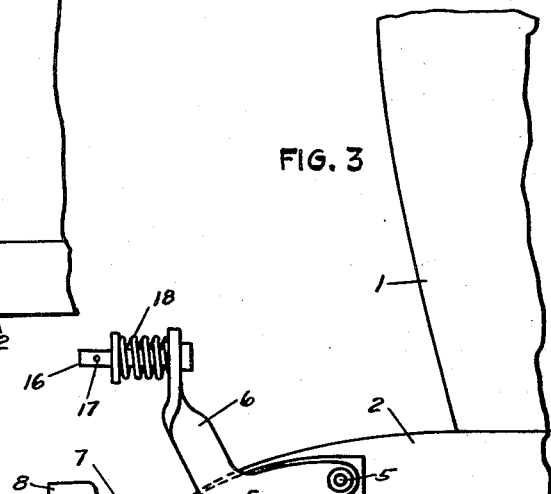
INVENTOR
EDWARD H. McCLOUD.
BY Toulmin & Toulmin
ATTORNEYS Oct. 23, 1928. 1,689,149
E. H. McCLOUD
AUTOMOBILE SPARE WHEEL CARRIER AND BUMPER
Filed Feb. 6, 1928 2 Sheets-Sheet 2
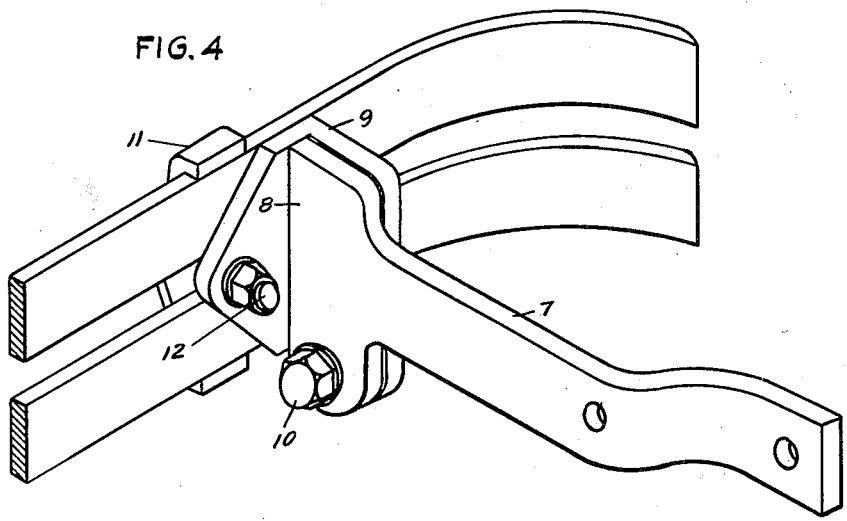
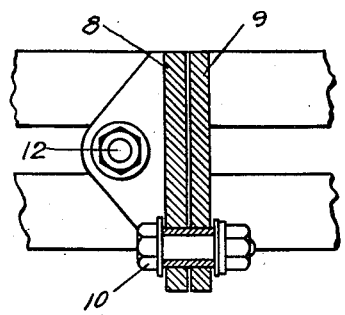
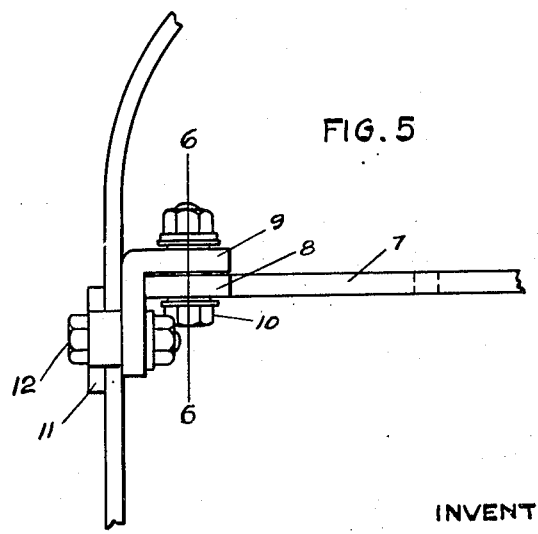
INVENTOR
EDWARD H. McCLOUD.
BY
ATTORNEYS Patented Oct. 23, 1928.

1,689,149

UNITED STATES PATENT OFFICE.

EDWARD H. McCLOUD, OF COLUMBUS, OHIO, ASSIGNOR TO THE CENTRAL BRASS & FIXTURE COMPANY, OF SPRINGFIELD, OHIO, A CORPORATION OF OHIO.

AUTOMOBILE SPARE-WHEEL CARRIER AND BUMPER.

Application filed February 6, 1928. Serial No. 252,088.

This invention relates to improvements in automobile spare wheel carriers and bumpers.

The object of the invention is, first, to provide a spare wheel carrier where the wheel is of the wire or disc type as distinguished from the separate rubber tires themselves; and secondly, to provide a combination of such wheel carrier with a bumper so coordinated that the wheel carrier and the bumper may be held in a normal position, the carrier to carry the wheel and the bumper to protect the wheel and the machine; and may also be adjusted to an abnormal position in which the bumper becomes placed out of the way of access to the wheel and the wheel becomes placed near the ground for the easy demounting or mounting of the wheel from and on the carrier.

In the accompanying drawings,

Figure 1 is a rear elevation of my improved wheel carrier and combined bumper, showing the outline of an automobile body from the rear;

Figure 2 is a side elevation in part and a sectional view in part, the carrier proper being in section and both carrier and bumper being in normal position;

Figure 3 is a like elevation with the carrier and tire now adjusted to the abnormal or mounting and demounting position.

Figure 4 is a detail perspective view showing how the pivot plate of the bumper is secured thereto.

Figure 5 is a detail view showing the manner of connecting the forward arch to the machine.

Figure 6 is a section on the line 6—6 of Figure 5.

The numeral 1 designates an automobile body mounted upon the usual chassis indicated at 2 and supported by rear side springs 3. To each chassis bar is secured a bracket 4 by bolts and nuts or other fastening devices 5. These brackets each have arms 7, terminating in a vertical extension 8. To this extension is pivoted a plate best shown at 9 in Figures 3 and 4, the point of the pivot being indicated at 10. This plate is connected to the bumper in any desired manner, but preferably as shown in Figure 4, in which connection the clamping plate 11 and bolt 12 form a part.

Thus the bumper at its ends is pivoted to the arm 7 of the bracket 4, so that the bumper may be swung from the normal position shown in Figures 1 and 2, in which the bumper protects the vehicle and the extra wheel and its carrier, to the abnormal position shown in Figure 3 where the bumper is receded out of the way of mounting and demounting the wheel on and from the wheel carrier. The wheel carrier itself is composed of an arched bar 13 whose ends are secured to the bumper through the bolts 12 before referred to which, as seen in Fig. 2, pass through the bumper and the lower outer ends of the arched bar 13. The upper portion of the arch 13 carries a disc or plate 14 equipped with studs or projections 15 fashioned to make a suitable connection with a wire wheel or a disc wheel, as the case may be.

In order to secure the bumper and this wheel carrier in upper or normal position, a backwardly extending arch 6 is secured in any desired manner to the machine preferably in the manner illustrated in Fig. 3. The arch 6 is equipped with a locking bolt 16 which extends through the disc 14 and arch 13, and has a retaining device or pin 17, while a coil spring 18 is placed between the disc 14 and the arch 6 to exert a pressure against the disc to hold it against the retaining pin 17 and to prevent rattling of the parts.

When it is desired to lower the carrier to the position shown in Figure 3 for the removal of a wheel or for mounting one on the carrier, the retaining pin 17 is withdrawn and the carrier and bumper are swung down, turning on the pivots 10, to the convenient position shown in Figure 3 where the carrier or wheel will usually touch the ground or floor.

It will be seen that here is a combined wheel carrier and bumper, both capable of a normal position in which the wheel is carried and the bumper protects the wheel and carrier and the machine, and an abnormal position in which the bumper recedes out of the way and the wheel carrier assumes a position convenient to the user for mounting or demounting the wheel.

I regard myself as the first to devise such a structure, and, therefore, wish to be understood as making broad claim thereto, quite independently of any special details that enter into the construction.

I desire to comprehend within my invention such modifications as may be clearly embraced within my claims and the scope of my invention.

Having thus fully described my invention, what I claim is new and desire to secure by Letters Patent, is:

1. The combination with an automobile, of a wheel carrier and bumper connected thereto, both the wheel carrier and the bumper being movable from normal to abnormal position.

2. The combination with an automobile chassis, of a wheel carrier and bumper connected to the said chassis, both the wheel carrier and the bumper being movable from normal to abnormal position.

3. The combination with an automobile chassis, of an interconnected bumper and wheel carrier, the bumper and carrier being pivotally connected with the chassis.

4. The combination with an automobile chassis, of a bracket secured to the chassis, and a wheel carrier and bumper pivotally mounted upon said bracket.

5. The combination with an automobile chassis, of a bracket secured to the chassis, a wheel carrier and bumper pivotally mounted upon the bracket for rotation in a vertical plane, the carrier and bumper being movable together as a unit.

6. The combination with an automobile chassis, of a bumper and wheel carrier, means for pivotally connecting both the bumper and wheel carrier to the chassis, and means for retaining the bumper and carrier in normal position.

7. The combination with an automobile chassis, of a bumper and wheel carrier, means for pivotally connecting both the bumper and wheel carrier to the chassis, and means for retaining the bumper and carrier in normal position, including a spring to take up any loss motion in the parts.

8. The combination with an automobile, of a wheel carrier consisting of an arch bar connected with the chassis and having devices to receive the wheel, and locking means for said arch bar consisting of another arch secured at its ends to the bumper and having locking means adapted to engage with the carrier arch.

In testimony whereof, I affix my signature.

EDWARD H. McCLOUD.